Dec. 1, 1959                W. C. VAN SICKLE ET AL                2,915,113
                               TIRE BUFFING MACHINE
Filed Jan. 13, 1956                                              3 Sheets-Sheet 1
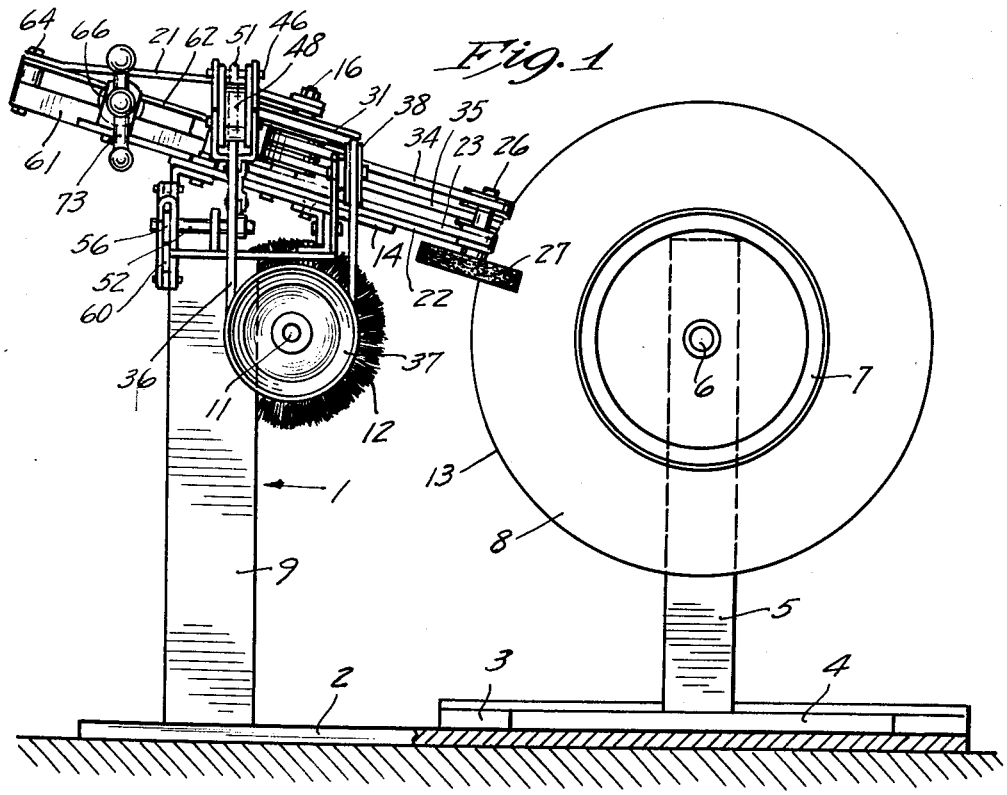
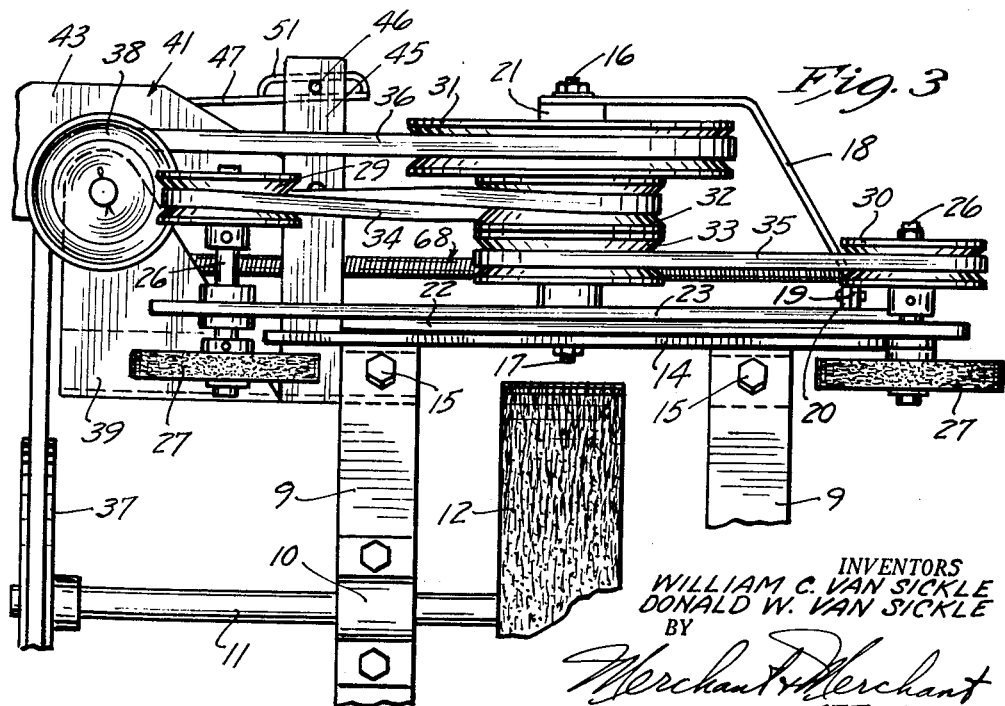
INVENTORS
WILLIAM C. VAN SICKLE
DONALD W. VAN SICKLE
BY
ATTORNEYS Dec. 1, 1959 W. C. VAN SICKLE ET AL 2,915,113
TIRE BUFFING MACHINE
Filed Jan. 13, 1956 3 Sheets-Sheet 2

INVENTORS
WILLIAM C. VAN SICKLE
DONALD W. VAN SICKLE
BY
Merchant & Merchant
ATTORNEYS Dec. 1, 1959 W. C. VAN SICKLE ET AL 2,915,113
TIRE BUFFING MACHINE
Filed Jan. 13, 1956 3 Sheets-Sheet 3
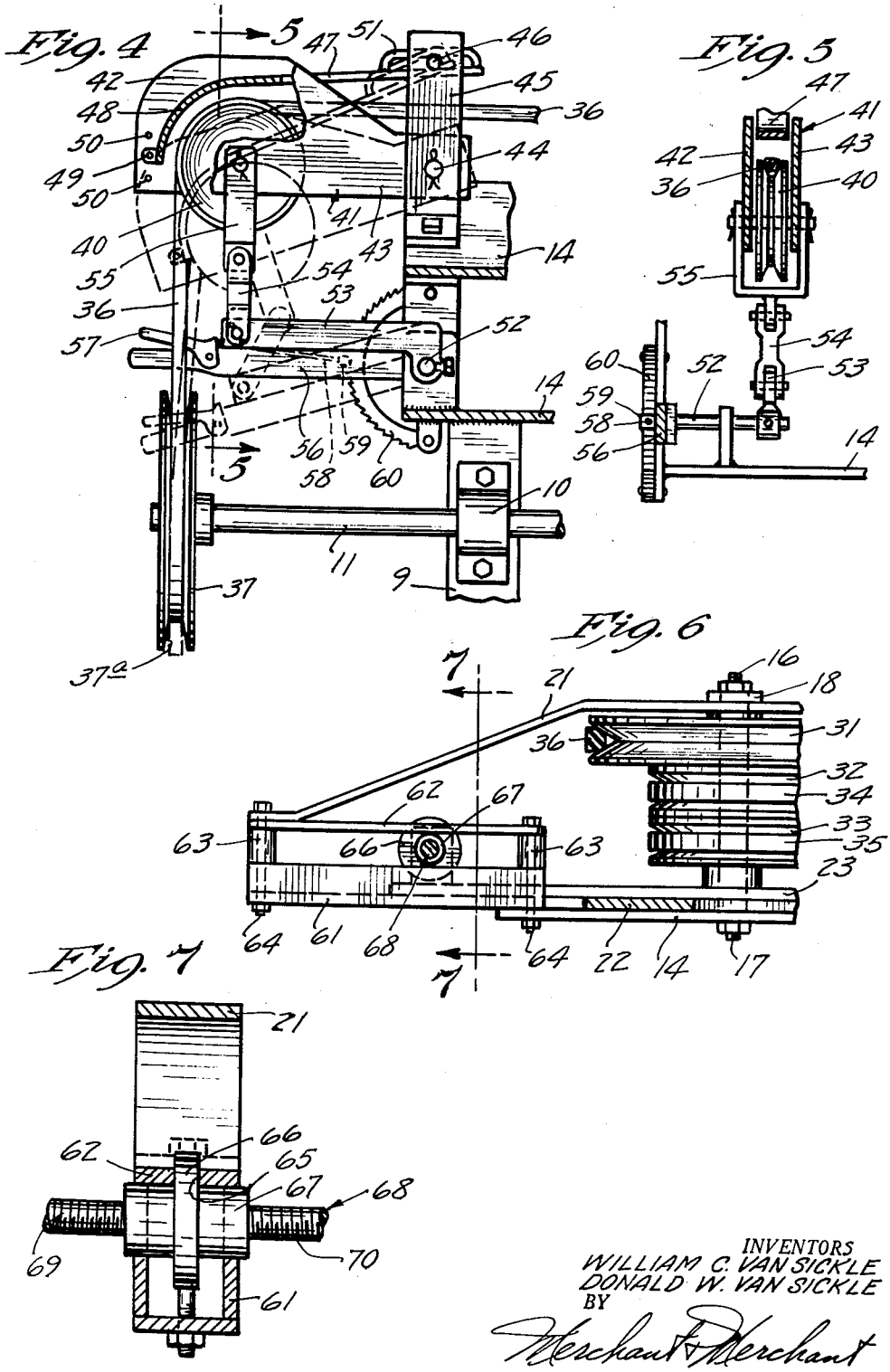
INVENTORS
WILLIAM C. VAN SICKLE
DONALD W. VAN SICKLE
BY
ATTORNEYS

United States Patent Office 2,915,113
Patented Dec. 1, 1959

2,915,113

TIRE BUFFING MACHINE

William C. Van Sickle and Donald W. Van Sickle, Owatonna, Minn.

Application January 13, 1956, Serial No. 558,902

5 Claims. (Cl. 157—13)

Our invention relates generally to buffing machines utilized to roughen and dress pneumatic tire casings preparatory to retreading the same, and more specifically to an attachment for such buffing machines which is particularly adapted for use in buffing the shoulder forming side wall portions thereof.

The primary object of our invention is the provision of an attachment for buffing machines which will quickly and efficiently buff the shoulder defining side wall portions of a pneumatic tire casing to remove the design forming relatively heavy radial ridges generally found on many tire casings in order that new tread rubber will more effectively adhere thereto.

Another important object of our invention is the provision of a buffing device which will produce minute radially extending grooves in the shoulder defining side wall portions of a tire casing for the escape of gases between the tire casing and the retreading mold during the retreading operation.

Another object of our invention is the provision of a buffing attachment as set forth which can be readily mounted on conventional tire buffing machines, and which will eliminate the necessity of making extensive adjustments on such machines when it is desired to use the same to buff the side walls of a tire.

Still another object of our invention is the provision of an attachment of the above type which can be produced at relatively low cost, which is highly efficient in operation, and which is rugged in construction and durable in use.

The above and still further highly important objects and advantages of our invention will become apparent from the following detailed specification, appended claims and attached drawings.

Referring to the drawings, which illustrate the invention, and in which like reference characters indicate like parts throughout the several views:

Fig. 1 is a view in side elevation of our buffing attachment shown as being mounted on a conventional tire buffing machine;

Fig. 3 is a fragmentary view in front elevation as seen from the line 3—3 of Fig. 2;

Fig. 4 is a fragmentary section taken substantially on the line 4—4 of Fig. 2;

Fig. 5 is a fragmentary detail taken substantially on the line 5—5 of Fig. 4;

Fig. 6 is a fragmentary view partly in elevation and partly in section taken substantially on the line 6—6 of Fig. 2, and Fig. 7 is an enlarged fragmentary section taken substantially on the line 7—7 of Fig. 6.

Figure 2:
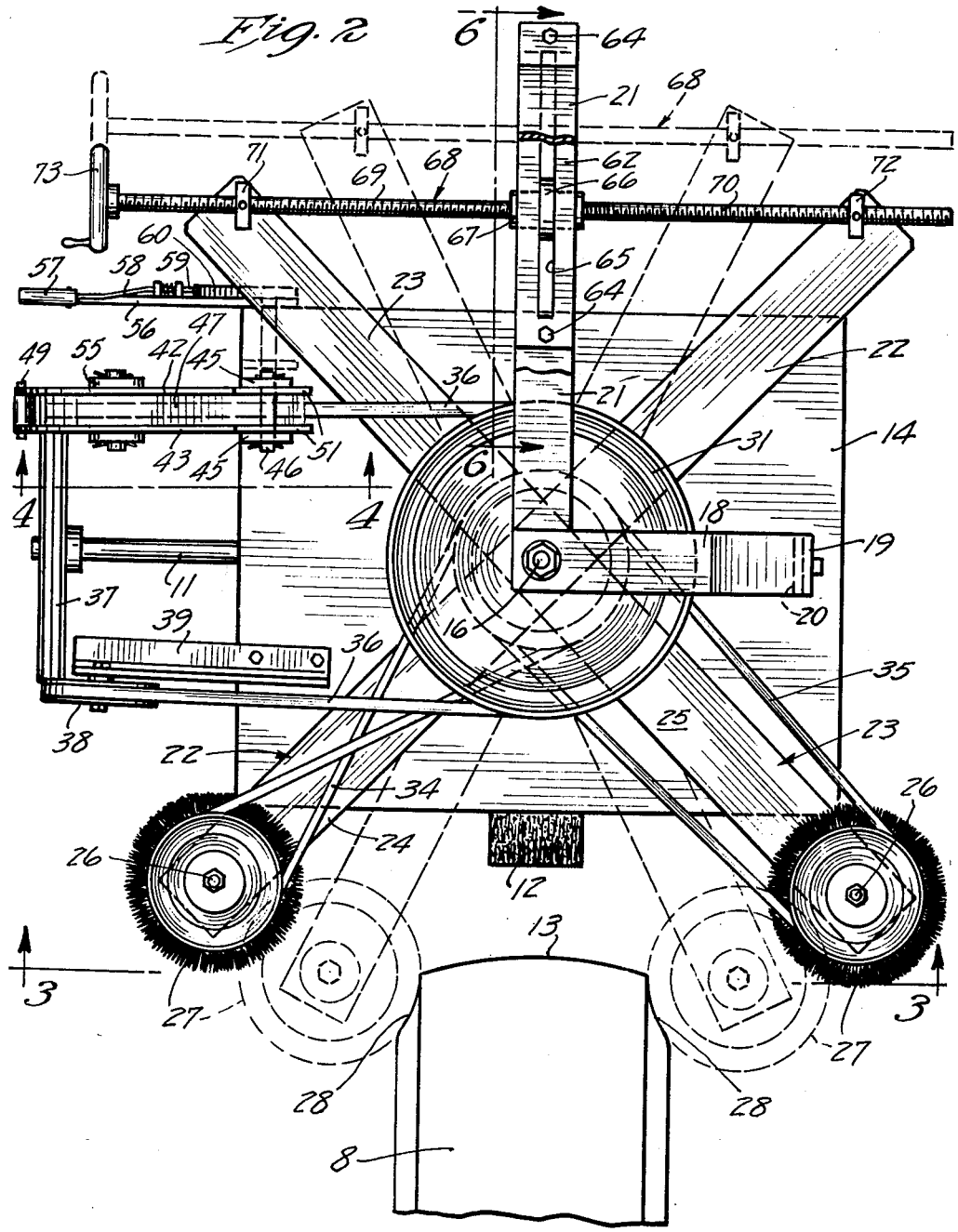
Fig. 2 is an enlarged view in plan of the buffing attachment of Fig. 1, some parts being broken away and some parts shown in section.

Referring in greater detail to the drawings, and more particularly to Fig. 1, a conventional tire buffing machine is shown more or less diagrammatically and indicated in its entirety by the numeral 1. The buffing machine 1 involves a base plate 2 having guide means 3 for the reception of a foot 4 of a generally vertical pedestal element 5. The pedestal element 5 is provided with a horizontally disposed shaft 6 on which is mounted a wheel 7 which supports a conventional pneumatic tire 8. The foot equipped pedestal 5 and parts carried thereby are adapted to be moved toward and away from a buffing wheel supporting structure involving a generally vertical supporting column 9 having bearings 10, one of which is shown, said bearings journalling a horizontally disposed drive shaft 11 on which is removably mounted a buffing wheel 12. The buffing wheel 12 may be any one of several types used for the purpose of buffing or dressing the road engaging crown surface of a pneumatic tire casing preparatory to the application of new tread rubber to the tire casing. However, for the purpose of the present example the buffing wheel 12 is shown as being in the nature of a rotary wire brush. The drive shaft 11 may be assumed to be power rotated by any suitable means such as a motor, not shown. Inasmuch as the drive means for the shaft 11 as well as other details of construction of the buffing machine 1 do not in themselves comprise the instant invention, and for the sake of brevity, detailed showing and description thereof is omitted. It will be understood, however, that the pedestal 5 may be rotated on its own axis, and that suitable means may, if desired, be utilized for rotating the tire mounted wheel 7 on its own axis on the spindle 6 whereby the road engaging crown 13 of the tire 8 may be buffed to the desired contour.

Our novel attachment involves a generally rectangular base member 14 which is adapted to be rigidly secured to the top of the supporting structure or column 9 by means of suitable brackets and nut-equipped bolts or the like 15. With reference to Figs. 1 and 3 it will be seen that the base member 14 is disposed in overlying spaced relation to the buffing wheel 12 and slopes forwardly and downwardly toward the axis of the wheel supporting spindle 6 for a purpose which will hereinafter become apparent. A generally upright supporting shaft 16 is bolted or otherwise rigidly secured at its lower end 17 to the base member 14 above the buffing wheel 12 and extends upwardly from the base member, the axis of the supporting shaft 16 being normal to the plane of the base member 14. An angular brace member 18 has its lower end 19 rigidly secured to an anchoring flange 20 on the base member 14, and its upper end rigidly secured to the upper end of the supporting shaft 16 to support said upper end against movement away from its normal relationship with the base member 14. A second angular brace member 21 is also secured at its upper end to the upper end of the supporting shaft 16 and assists the brace member 18 in rigidly holding the supporting shaft 16. The lower end of the brace member 21 is rigidly connected to the base member 14 by means to be hereinafter described.

A pair of elongated arms 22 and 23 are pivotally mounted intermediate their ends on the supporting shaft 16 in crossed relationship whereby the front end portions 24 and 25 thereof, respectively, are disposed in angular relationship in a plane substantially normal to the axis of the supporting shaft 16. A pair of relatively short shafts 26 are journalled one each in the front ends of the arms 22 and 23 for rotation on axes parallel to the axis of the supporting shaft 16. Mounted on the lower ends of the shaft 26 are a pair of buffing heads 27 that are adapted to engage adjacent shoulder defining side wall portions 28 of the tire 8 upon swinging movements of the arms 22 and 23 in opposite directions. The buffing heads 27 may, like the buffing wheel 12, be of any suitable construction but preferably, and as shown, comprise rotary wire brushes of the usual construction.

Means for imparting rotary movement to the buffing heads 27 includes a pair of driven pulleys 29 and 30, the former being mounted fast on the upper end of the shaft 26 journaled in the front end 24 of the arm 22, and the latter of which is mounted fast on the shaft 26 journaled in the front end portion 25 of the arm 23. Journaled for rotation on the supporting shaft 16 is a power transmission pulley means including a relatively large first pulley element 31 and relatively smaller pulley elements 32 and 33. The pulley elements 31, 32, and 33 are secured together for common rotation on the shaft 16, the pulley element 32 being operatively coupled to the driven pulley 29 by an endless belt 34. The pulley element 33 is operatively coupled to the driven pulley 30 by an endless belt 35. Preferably, the above-mentioned pulleys and cooperating belts are of the "V" type. With reference to Figs. 2 and 3, it will be seen that the belt 34 is twisted whereby to provide crossed flights between the pulley element 32 and its respective driven pulley 29, whereas the belt 35 runs over its rsepective pulley element 33 and driven pulley 30 in the normal manner. With this arrangement, the driven pulley 30 and buffing head 27 coupled thereto will rotate in the same direction as the pulley elements 31, 32 and 33, while the driven pulley 29 and its cooperating buffing head 27 will rotate in the opposite direction. Inasmuch as opposing peripheral portions of the buffing heads 27 engage opposite sides of the tire 8, as shown in Fig. 2 rotation of the buffing heads 27 in opposite directions relative to each other causes buffing movement of the buffing heads on opposite sides of the tire in the same direction. Any tendency of the buffing heads 27 to impart a twist to the tire 8 is thus eliminated.

The first pulley element 31 is driven from the drive shaft 11 by a V-belt 36 running over the pulley element 31 and a drive pulley 37 keyed or otherwise rigidly secured to the drive shaft 11. The belt 36 further runs over an idler wheel or pulley 38 journaled on a supporting bracket 39 that is rigidly secured to the base member 14 and a second idler pulley 40 that is journalled for rotation on a bracket element 41 disposed in laterally spaced relationship to the supporting bracket 39. With reference to Fig. 4 it will be seen that the bracket element 41 is bifurcated to provide laterally spaced side plates 42 and 43, the pulley 40 being journaled therebetween and intermediate the ends thereof. The side plates 42 and 43 are mounted at their inner ends on a shaft 44 for swinging movements between an operative belt tightened position indicated by full lines in Fig. 4, and an inoperative position wherein the drive belt 36 is loosened from driving engagement with the drive pulley 37, as indicated by dotted lines in Fig. 4. In this connection it will be noted that the drive pulley 37 is provided with a relatively deep circumferential belt receiving groove 37A, the depth of which is sufficiently great to retain the drive belt 36 even when the same is loosened from driving engagement therewith. The pivot pin or shaft 44 is mounted between a pair of supporting legs 45 which extend upwardly from the base member 14, which legs support a second pin or shaft 46 in upwardly offset parallel relation to the shaft 44. A brake element 47 has a downwardly curved outer end portion 48 which overlies the idler pulley 40 in normally radially outwardly spaced relationship thereto. The extreme outer end of the brake element or shoe 47 is pivotally secured to the outer ends of the side plates 42 and 43 as indicated at 49. With reference to Fig. 4 it will be seen that the side plates 42 and 43 are provided with a plurality of vertically spaced openings 50 by means of which the pivotal connection 49 may be adjusted whereby to vary the distance between outer end portion 48 of the brake shoe 47 and the underlying idler pulley engaged portion of the drive belt 36. At its rear end portion, the brake shoe 47 is provided with a longitudinally extending loop 51 by means of which the inner end portion of the brake shoe 47 is mounted for longitudinal sliding and pivotal movements on the pin 46. The offset relationship between the shaft or pin 44 and the pin 46 is such that, when the bracket element 47 is swung to its inoperative dotted line position of Fig. 4, the outer curved end portion 48 of the brake shoe 47 will move into frictional locking engagement with the portion of the drive belt 36 engaged by the idler pulley 40 and frictionally hold the same against driving movement. This engagement of the belt 36 by the brake shoe 47 further prevents the drive belt 36 from being accidentally driven by the drive pulley 37 even when the belt is but loosely contained in the pulley 37.

The bracket element 41 and parts carried thereby are gravity biased toward their inoperative dotted line position of Fig. 4 to uncouple the drive belt from driving engagement with the drive pulley 37. Means for moving the bracket element 41 and idler pulley 40 to their operative belt-tightened position, and for releasably locking the same therein comprises, a rock shaft 52 journaled in suitable bearings in the base member 1, a crank arm 53 rigidly secured to one end of the rock shaft 52, and a pitman arm 54 pivotally secured at its lower end to the outer end of the crank arm 53 and at its upper end to a bifurcated yoke element 55 that is rigidly secured to the side plates 42 and 43 of the bracket element 41. An operating lever 56 is rigidly secured at its inner end to the shaft 52 and is provided adjacent its outer end with a latch handle 57 pivotally secured thereto, said latch handle being connected by a tie rod 58 to a pawl element 59 for moving the same into and out of locking engagement with the teeth on a semicircular ratchet element 60 rigidly mounted by suitable bracket means on the base member 1 in concentric relation to the rock shaft 52. With reference to Fig. 4 it should be obvious that, when the pawl 59 is released from engagement with the ratchet 60, lowering of the lever 56 will cause loosening of the belt 36 to stop rotary movement of the buffing heads 27, and that raising of the lever 56 causes the idler pulley 40 to move in a direction to tighten the belt 36. The latch handle 57 and tie rod 58 are of conventional structure and it may be assumed that the pawl 59 is yieldingly urged toward engagement with the teeth of the ratchet 60 by a spring or the like, not shown.

Projecting rearwardly from the intermediate portion of the base member 14 is a channel-like supporting arm 61, see Figs. 1, 6 and 7. A guide bar 62 is mounted on the supporting bar 61 in upwardly spaced parallel relationship thereto by means of spacer elements 63 at the opposite ends thereof and nut-equipped bolts or the like 64. With reference to Figs. 1, 2 and 6, it will be seen that the outer end of the brace member 21 is anchored to the outermost end of the guide bar 62. The guide bar 62 is so disposed that it extends in a direction radially of the axis of the supporting shaft 16, and is provided with a longitudinally extended slot or channel 65 which receives and guides the central flange 66 of a collar 67 that is slidably mounted between the supporting bar 61 and the guide bar 62. The collar 67 is rigidly secured to the intermediate portion of a screw device 68 which comprises a pair of cooperating screw sections 69 and 70. One of said sections is provided with right-hand threads, the other thereof being provided with left-hand threads. The screw section 69 makes screw threaded engagement with a nut element 71 pivotally secured to the rear end portion of the arm 23, and the screw section 70 likewise has screw threaded engagement with a cooperating nut element 72 pivotally secured to the rear end portion of the arm 22. A handle equipped operating wheel 73 is rigidly secured to one end of the screw device 68 to rotate the same in opposite directions. The flange 66 of the collar 67 being partially contained in the slot or channel 65, prevents axial movement of the screw device 68, so that rotation of the screw device 68 will cause the arms 22 and 23 to move simultaneously about the axis of the supporting shaft 16, whereby to move the buffing heads 27 simultaneously toward or away from engagement with the side wall portions 28 of the tire 8. This swinging movement of the arms 22 and 23 causes the screw device 68 to move bodily toward or away from the supporting shaft 16, such movement being permitted by the channel 65.

In use, the tire 8 is first buffed on its road engaging crown surface 13 by the buffing wheel 12, the arms 22 and 23 being moved to their full-line position of Fig. 2, and the idler wheel 40 being lowered to its inoperative position. After the crown surface portion 13 of the tire has been buffed or dressed to the desired extent, the pedestal 5 is moved in a direction to withdraw the tire from engagement with the buffing wheel 12 substantially to its position shown in Fig. 2. The lever 56 is then raised to move the idler pulley 40 to its operative full-line position of Fig. 4, and the screw device 68 is manipulated to move the buffing heads 27 simultaneously into operative engagement with the shoulder defining side wall portions 28 of the tire. The tire is rotated during the side wall buffing operation in the customary manner until this buffing operation is also completed. The tire is then ready for application of tread rubber thereto and insertion into a mold for curing.

We have found that with the use of our machine, improved control of the treading operation has resulted, resulting in a more efficient retreading operation, both in the producing of a full retread wherein new rubber is applied both to the road engaged crown and to the shoulder defining side wall portions of the tire, as well as in top capping wherein rubber is applied only to the road engaging crown surface portion of the tire casing. The minute radial grooves formed in the side wall portions of the tire buffed by our improved device permits escape of gases from the mold during the curing operation and eliminates the necessity for vents in the mold. This arrangement eliminates the usual radially outwardly projecting stems of rubber which heretofore have had to be manually severed from the finished tire. In top capping the confining flanges of the mold fit nicely at the relatively smooth side edges of the road engaging crown surface, thus eliminating the necessity for manually trimming off beads of rubber which would otherwise escape outwardly between the confining flanges of the mold and the spaces between the circumferentially spaced radial ribs found on many tires and tend to loosen the edges of the tread. Thus, with either full retreading or top capping a tire casing buffed with our novel machine results in a finished tire that is entirely devoid of the appearance of a retreaded or recapped tire.

Our invention has been thoroughly tested and found to be completely satisfactory for the accomplishment of the objects set forth; and, while we have shown and described a commercial embodiment of our novel buffing machine, it will be understood that the same is capable of modification, and that such modification may be made without departure from the spirit and scope of the invention as defined in the claims.

What we claim is:

1. In a tire buffing machine, a mounting device for supporting a tire for rotation on a horizontal axis, a supporting structure, a horizontal power operated drive shaft journaled in said supporting structure on an axis generally parallel to the axis of a tire on said device, a buffing wheel mounted on said drive shaft and adapted to make buffing contact with the road engaging crown surface of a tire mounted on said device, a base member mounted on the upper end of said supporting structure, a generally upright supporting shaft rigidly mounted on and projecting upwardly from said base member in overlying spaced relation to said buffing wheel, a pair of arms pivotally mounted intermediate their ends on said supporting shaft, said arms being angularly disposed relative to each other in a plane substantially normal to the axis of said supporting shaft, a pair of rotary buffing heads one each mounted on the front end portion of a different one of said arms for rotation on axes generally parallel to the axis of said supporting shaft, a rotary driving element journaled for rotation on said supporting shaft, means including a drive belt operatively coupling said driving element to the drive shaft on said supporting structure, power transmission mechanism coupling said driving element to each of said buffing heads to impart rotary movement to said heads in opposite directions relative to each other responsive to rotation of said driving element in one direction, and means for moving said arms relative to each other about the axis of said supporting shaft to move said buffing heads toward and away from buffing engagement with opposite shoulder-defining side wall portions of said tire, said buffing heads being positioned to buff said shoulders in directions generally radially of said tire.

2. In a tire buffing machine, a tire mounting device, a supporting structure, a horizontal power-operated drive shaft journaled in said supporting structure, a buffing wheel mounted on said drive shaft and adapted to make buffing contact with the road engaging crown surface of a tire mounted on said device, a base member mounted on the upper end of said supporting structure, a generally upright supporting shaft rigidly mounted on and projecting upwardly from said base member is overlying spaced relation to said buffing wheel, a pair of arms pivotally mounted intermediate their ends on said supporting shaft, said arms being angularly disposed relative to each other in a plane substantially normal to the axis of said supporting shaft, a pair of rotary buffing heads, one each mounted on the front end portion of a different one of said arms for rotation on axes generally parallel to the axis of said supporting shaft, a rotary driving element journaled for rotation on said supporting shaft, power transmission mechanism coupling said driving element to each of said buffing heads to impart rotary movement to said heads in opposite directions relative to each other responsive to rotation of said driving element in one direction, means for moving said arms relative to each other about the axis of said supporting shaft to move said buffing heads toward and away from buffing engagement with opposite shoulder-defining side wall portions of said tire, means operatively coupling said driving element to the drive shaft on said supporting structure and including, a drive belt, a drive pulley on said drive shaft and entraining said drive belt, an idler pulley operatively engaging said drive belt, means mounting said idler pulley for movements between an operative belt tightened position wherein said drive belt is loosened from driving engagement with said drive pulley, and mechanism for locking said idler pulley mounting means in its operative position, and a brake element mounted for movement toward and away from frictional locking engagement with said drive belt and responsive to movement of said idler pulley mounting means toward its inoperative position to engage said belt and stop movement thereof.

3. In a tire buffing machine, a tire mounting device, a supporting structure, a horizontal power-operated drive shaft journaled in said supporting structure, a buffing wheel mounted on said drive shaft and adapted to make buffing contact with the road engaging crown surface of a tire mounted on said device, a base member mounted on the upper end of said supporting structure, a generally upright supporting shaft rigidly mounted on and projecting upwardly from said base member in overlying spaced relation to said buffing wheel, a pair of arms pivotally mounted intermediate their ends on said supporting shaft, said arms being angularly disposed relative to each other in a plane substantially normal to the axis of said supporting shaft, a pair of rotary buffing heads, one each mounted on the front end portion of a different one of said arms for rotation on axes generally parallel to the axis of said supporting shaft, a rotary driving element journaled for rotation on said supporting shaft, power transmission mechanism coupling said driving element to each of said buffing heads to impart rotary movement to said heads in opposite directions relative to each other responsive to rotation of said driving element in one direction, means for moving said arms relative to each other about the axis of said supporting shaft to move said buffing heads toward and away from buffing engagement with opposite shoulder defining side wall portions of said tire, means operatively coupling said driving element to the drive shaft on said supporting structure and including, a drive belt, a drive pulley on said drive shaft and entraining said drive belt, and idler pulley operatively engaging said drive belt, means mounting said idler pulley for movements between an operative belt tightened position and an inoperative position wherein said drive belt is loosened from driving engagement with said drive pulley, said idler pulley mounting means being yieldingly biased toward its inoperative position, and mechanism for locking said idler pulley mounting means in its operative position against said yielding bias, and a brake element operatively coupled to said idler pulley mounting means for movements toward and away from frictional locking engagement with said drive belt and responsive to movement of said idler pulley mounting means towards its inoperative position to engage said belt and stop movement thereof.

4. The structure defined in claim 3 in which said idler pulley mounting means comprises a bracket element pivotally secured at its inner end to said base member, said idler pulley being journaled on said bracket element intermediate the ends thereof, and in which said brake element comprises a brake shoe overlying a portion of the drive belt carried by said idler pulley and pivotally secured at one end to the outer end portion of said bracket element, the inner end of said brake shoe being mounted on said base member for pivotal swinging movements about an axis offset from the axis of swinging movement of said bracket element and for longitudinal sliding movements with respect thereto, the offset relationship of said axes being such that, when said idler pulley is moved toward its inoperative position the brake shoe will be carried by said bracket element into frictional locking engagement with the portion of the drive belt carried by said idler pulley.

5. An attachment for a tire buffing machine of the type comprising a tire mounting device, a supporting structure, a horizontal power-operated drive shaft journaled in said supporting structure, and a buffing wheel mounted on said drive shaft and adapted to make buffing contact with the road engaging crown surface of a tire mounted on said device, said attachment comprising, a base member adapted to be mounted on the upper end of said supporting structure, a generally upright supporting shaft mounted on and projecting upwardly from said base member, a pair of arms pivotally mounted on said supporting shaft longitudinally inwardly from the front end of each of said arms, a pair of rotary buffing heads, one each mounted on the front end of a different one of said arms for rotation on axes generally parallel to the axis of said supporting shaft, a rotary driving element journaled on said supporting shaft, means for operatively coupling said driving element to the drive shaft on said supporting structure, power transmission mechanism coupling said driving element to each of said buffing heads to impart rotary movement to said heads in opposite directions relative to each other responsive to rotation of said driving element in one direction, and means for moving said arms relative to each other about the axis of said supporting shaft to vary the distance between said buffing heads, whereby said buffing heads will operatively engage opposite sides of a tire casing adjacent the road engaging crown surface thereof.

References Cited in the file of this patent

UNITED STATES PATENTS

| 806,914 | Pitt | Dec. 12, 1905 |
| 1,603,249 | Stevens | Oct. 12, 1926 |
| 2,321,936 | Pollock | June 15, 1943 |
| 2,366,685 | Chambers | Jan. 2, 1945 |